United States Patent [19]

Moerder

[11] Patent Number: 4,634,808
[45] Date of Patent: * Jan. 6, 1987

[54] DESCRAMBLER SUBSCRIBER KEY PRODUCTION SYSTEM UTILIZING KEY SEEDS STORED IN DESCRAMBLER

[75] Inventor: Karl E. Moerder, Poway, Calif.

[73] Assignee: M/A-COM Government Systems, Inc., San Diego, Calif.

[*] Notice: The portion of the term of this patent subsequent to Sep. 23, 2003 has been disclaimed.

[21] Appl. No.: 589,741

[22] Filed: Mar. 15, 1984

[51] Int. Cl.$^4$ .............................................. H04L 9/00
[52] U.S. Cl. .............................. 178/22.14; 178/22.17; 178/22.15; 178/22.09; 358/122
[58] Field of Search ............... 178/22.09, 22.13, 22.15, 178/22.11, 22.16, 22.14; 358/114, 122, 124

[56] References Cited

U.S. PATENT DOCUMENTS

| | | | |
|---|---|---|---|
| 3,659,046 | 4/1972 | Angeleri et al. | 178/22.13 |
| 3,911,216 | 10/1975 | Bartek et al. | 178/22.15 |
| 3,914,534 | 10/1975 | Forbes | 358/122 |
| 4,058,830 | 11/1977 | Guinet et al. | 358/114 |
| 4,168,396 | 9/1979 | Best | 178/22 |
| 4,200,770 | 4/1980 | Hellman et al. | 178/22.11 |
| 4,292,650 | 9/1981 | Hendrickson | 358/122 |
| 4,323,921 | 4/1982 | Guillou | 358/114 |
| 4,337,483 | 6/1982 | Guillou | 358/114 |
| 4,354,201 | 10/1982 | Sechet et al. | 358/122 |
| 4,365,110 | 12/1982 | Lee et al. | 78/22.09 |
| 4,388,643 | 6/1983 | Aminetzah | 358/123 |
| 4,461,032 | 7/1984 | Skerlos | 455/4 |
| 4,467,139 | 8/1984 | Mollier | 178/22.08 |
| 4,471,164 | 9/1984 | Henry | 178/22.11 |
| 4,484,027 | 11/1984 | Lee et al. | 178/22.13 |
| 4,531,020 | 7/1985 | Wechselberger et al. | 358/122 |
| 4,531,021 | 7/1985 | Bluestein et al. | 358/122 |

Primary Examiner—Salvatore Cangialosi
Assistant Examiner—Aaron J. Lewis
Attorney, Agent, or Firm—Edward W. Callan

[57] ABSTRACT

A system for reproducing in a descrambler of a subscriber communication network a subscriber key signal that is unique to the descrambler and was used in encrypting a key signal that must be decrypted for use in descrambling a signal received by the descrambler. The scrambled signal is received by the descrambler together with the encrypted key signal and a key generation number containing an address for accessing a predetermined area in a memory contained in the descrambler. The system includes a circuit for providing a subscriber key generation signal that is unique to the descrambler; a subscriber key generator for reproducing the unique subscriber key signal by processing the subscriber key generation signal in accordance with a predetermined encryption algorithm upon the algorithm being keyed by a prescribed subscriber key seed signal that is unique to the descrambler; a secure memory storing a plurality of different subscriber key seed signals, and for providing the prescribed seed signal to key the algorithm when the area of the memory containing the prescribed seed signal is accessed by the address contained in the received key generation number; and a circuit for accessing the first memory with the address contained in the received key generation number. The subscriber key generation signal is formed by combining the received key generation number with a unique subscriber address signal that is stored in a second memory of the descrambler.

24 Claims, 4 Drawing Figures

DESCRAMBLER SUBSCRIBER KEY PRODUCTION SYSTEM UTILIZING KEY SEEDS STORED IN DESCRAMBLER

CROSS REFERENCE TO RELATED APPLICATION

This application is directed to subject matter that also is described in co-pending U.S. Patent Application Ser. No. 498,800 filed May 27, 1983 by Klein S. Gilhousen and Charles F. Newby, Jr. for "KEY SIGNAL ENCRYPTION AND DISTRIBUTION SYSTEM FOR CONTROLLING SCRAMBLING AND SELECTIVE REMOTE DESCRAMBLING OF TELEVISION SIGNALS," which is assigned to the same assignee as this application.

BACKGROUND OF THE INVENTION

The present invention generally pertains to communication signal scrambling and descrambling systems utilizing encryption technology and is particularly directed to a system for reproducing in a descrambler a key signal that is unique to the descrambler and was used in encrypting a key signal that must be decrypted for use in descrambling a signal received by the descrambler.

In the prior art the unique key signal that is used in encrypting the key signal that must be decrypted is stored in a memory contained in the descrambler and is accessed from the memory for use in decrypting a received encrypted key signal intended for the descrambler. Typically a person in possession of the descrambler could ascertain the unique key signal by reading it from the memory. The fact that the unique key signal could be ascertained by a possessor of a descrambler presented a significant problem when it was proposed by the applicants of cross-referenced Application Ser. No. 498,800 to use key signal encryption techniques for controlling the distribution of scrambled television signals to subscriber of a television suscription service. Although only the unique key signals of paid-up subscribers would be used in controlling such distribution, it was apparent that if a paid-up subscriber could ascertain his unique subscriber key signal stored in the memory of his descrambler, such unique subscriber key signal could then be stored in the memory of unauthorized descramblers to enable pirating of the scrambled television signals.

One solution to this problem suggested by the applicants of Application Ser. No. 498,800 was to use a secure memory in each descrambler for storing the subscriber key signal that is unique to the descrambler. A secure memory is an internal read only memory (ROM) in an integrated circuit microprocessor chip having an internal architecture that prohibits the ROM from being read off chip. The secure memory approach provides a high level of security against a person in possession of a descrambler ascertaining the unique subscriber key signal for such descrambler.

It is an object of the present invention to so complicate the reproduction of the unique subscriber key signal in the descrambler as to further lessen the probability of unauthorized ascertainment and use of such key signal.

It is a further object of the present invention to so complicate the reproduction of the subscriber key signal in such a manner as to make it practical for a plurality of broadcasters utilizing a common subscriber communication network to use subscriber key signals that are unique to both the individual subscriber and the individual broadcasters.

SUMMARY OF THE INVENTION

The present invention is a system for reproducing in a descrambler a subscriber key signal that is unique to the descrambler and was used in encrypting a key signal that must be decrypted for use in descrambling a signal received by the descrambler. In accordance with the present invention the descrambled signal is received by the descrambler together with the encrypted key signal, a key generation number and an address for accessing a predetermined area in a memory contained in the descrambler. The statement that the scrambled signal is received together with the encrypted key signal and the key generation number does not necessarily mean that these signals are received together temporarily, but rather that all are received by the descrambler. In fact, the encrypted key signal for use in descrambling a given scrambled signal typically is transmitted to and received by the descrambler prior to the transmission and receipt of the given scrambled signal. The system of the present invention includes means for providing a subscriber key generation signal that is unique to the descrambler; a subscriber key generator for reproducing the unique subscriber key signal by processing the subscriber key generation signal in accordance with a predetermined encryption algorithm upon the algorithm being keyed by a prescribed subscriber key seed signal that is unique to the descrambler; a first memory storing the prescribed subscriber key seed signal, and for providing the prescribed seed signal to key the algorithm when the area of the memory containing the prescribed seed signal is accessed by the address received with the received key generation number; and means for accessing the first memory with the address received with the received key generation number. Preferably, the first memory is a secure memory.

The system of the present invention is particularly useful in a subscriber communication network, in such a common key signal is uniquely encrypted for each of a plurality of subscribers and must be decrypted by the use of a subscriber key signal that is unique for each subscriber for use in descrambling the scrambled signal.

The system of the present invention also is particularly useful in a subscriber communication network in which a common key signal is uniquely encrypted for a subscriber by a plurality of different scrambled signal broadcasters and must be decrypted by using a subscriber key signal that is unique to both the subscriber and the broadcaster for use in descrambling the scrambled signal and wherein the subscriber has a descrambler for uniquely descrambling the scrambled signals from a given one of the broadcasters by using the subscriber key signal that is unique to the given broadcaster to decrypt the uniquely encrypted key signal.

Preferably, the first memory stores a plurality of different subscriber key seed signals, with the prescribed one of the seed signals being provided to key the algorithm in accordance with the address received with the received key generation number. Should a list of subscriber key signals currently used by a given broadcaster become known, the broadcaster can either change the key generation number or change the address to thereby access a different subscriber key seed signal from the first memory of each descrambler in the subscriber network, whereupon a completely different list of subscriber key signals would be applicable for the network.

To further complicate the system, the preferred embodiment of the means in the descrambler for providing the subscriber key generation signal includes a second memory storing a subscriber address signal that is unique to the descrambler; and a circuit for combining the stored subscriber address signal and the received key generation number to provide the subscriber key generation signal. This technique enables the key generation number to be unique for different broadcasters that utilize a common subscriber communication network so that different unique subscriber key signals are reproduced in a given descrambler for use in respectively descrambling the scrambled signals broadcast by the different broadcasters; and further enables each broadcaster to broadcast a common key generation number to common groups of its subscribers.

Additional features of the present invention are described with reference to the description of the preferred embodiments.

DESCRIPTION OF THE PREFERRED EMBODIMENTS

Figure 1:
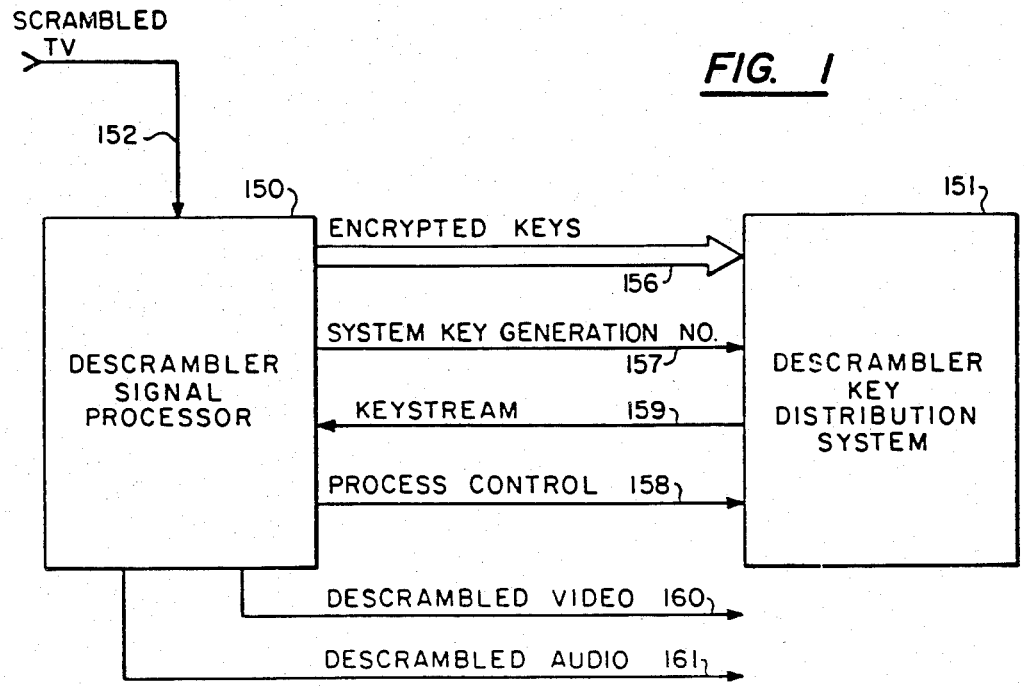
FIG. 1 is a functional block diagram of a descrambler utilizing the system of the present invention.

The preferred embodiments of the subscriber key reproduction system of the present invention are useful in the descrambler described in the cross-referenced U.S. Patent Application Ser. No. 498,800, the detailed disclosure of which is incorporated herein by reference. Common reference numerals are used to refer to elements that are described in both Application Ser. No. 498,800 and the present specification.

In the scrambler portion of the overall scrambling and descrambling system described in Application Ser. No. 498,800 the television signal is scrambled by processing the video and audio portions thereof with a keystream that is generated by a scrambler key distribution system. The scrambler key distribution system generates the keystream in accordance with the Data Encryption Standard (DES) algorithm upon the algorithm being keyed by a channel key signal that is provided by a control computer. The channel key signal must be used in the descrambler for descrambling the television signal. To prevent unauthorized descrambling of the television signal, the channel key signal is encrypted in accordance with the DES algorithm upon the algorithm being keyed by a category key signal that is common to a group of subscribers authorized to descramble the scrambled television signal. The encrypted channel key signal is inserted in the scrambled television signal by the scrambler signal processor and broadcast therewith to the descramblers in the subscriber network.

The category key signal also is encrypted. Moreover, the category key is uniquely encrypted in accordance with the DES algorithm upon the algorithm being keyed by each of a group of subscriber key signals that respectively are unique to the different descramblers in the subscriber network. The uniquely encrypted category key signals are addressed to their respective descramblers and inserted in the scrambled television signal by the scrambler signal processor for broadcast therewith to the respective descramblers in the subscriber network.

A listing of the unique subscriber key signals is maintained so as not to be accessible except by the scrambler key distribution system. Should this listing be compromised by unauthorized access a new listing of subscriber key signals must be provided and utilized. The control computer also provides to the scrambler signal processor a system key generation number that is unique to the broadcaster and the system key generation number is likewise inserted into the scrambled television signal for transmission therewith to all of the subscribers. The scrambler signal processor further inserts into the scrambled television signal an initialization vector (IV) frame count signal and process control signals provided by the control computer. A detailed description of the scrambler is provided in Application Ser. No. 498,800.

In each descrambler in order to descramble the scrambled television signal, the key stream used to scramble the television signal must be reproduced. In order to reproduce the keystream in the descrambler, the encrypted channel key signal must be decrypted to reproduce the channel key signal that was used to generate the keystream in the scrambler. In order to decrypt the encrypted channel key signal in a given descrambler, the unique encrypted category key addressed to the given descrambler must be decrypted to reproduce the category key signal that was used to encrypt the channel key signal in the scrambler. In order to decrypt the uniquely encrypted category key signal in a given descrambler, the unique subscriber key signal used for encrypting the category key signal in the scrambler must be reproduced in the descrambler.

Referring to FIG. 1, the descrambler includes a descrambler signal processor 150 and a descrambler key distribution system 151.

The descrambler signal processor 150 receives the scrambled television signal on line 152. From the received scrambled television signal on line 152, the descrambler signal processor separates and provides to the descrambler key distribution system 151, the IV frame count signal (not shown), the encrypted channel and encrypted category key signals on lines 156, the subscriber key generation number on line 157 and various process control signals on line 158 that are related to the operation of the descrambler key distribution system 151.

The descrambler key distribution system 151 responds to these signals received on lines 156–158 from the signal processor by reproducing the unique keystream used to scramble the video and audio components of the scrambled television signal received on line 152 and provides the unique keystream to the descrambler signal processor on line 159.

The descrambler signal processor 150 descrambles the scrambled television signal on line 152 in accordance with the unique keystream received on line 159 to provide a descrambled video signal on line 160 and a descrambled audio signal on line 161.

Figure 2:
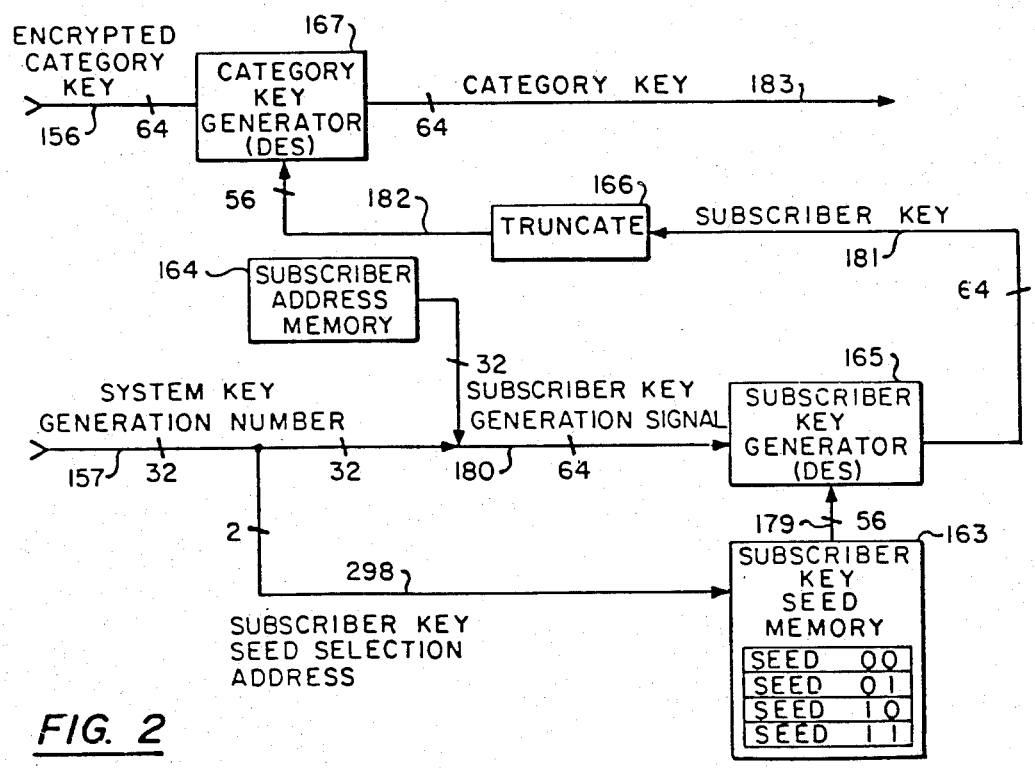
FIG. 2 is a functional block diagram of one preferred embodiment of the subscriber key reproduction system of the present invention.

Referring to FIG. 2, one preferred embodiment of the subscriber key reproduction system for use in the descrambler key distribution system 151 (FIG. 1) includes a secure subscriber key seed memory 163 storing four subscriber key seed signals, a subscriber address memory 164 storing a subscriber address signal that is unique to the descrambler and a subscriber key signal generator 165.

The memory 163 is addressed via line 298 by two bits included in a given position of a 32-bit system key generation number received on line 157 to provide one of the four stored unique subscriber 56-bit key seed signals on line 179.

A 32-bit unique subscriber address signal stored in the memory 164 is combined with the 32-bit system key generation number received on line 157 to provide a 64-bit subscriber key generation signal on line 180.

The subscriber key generator 165 generates a unique 64-bit subscriber key signal on line 181 by processing the subscriber key generation signal on line 180 in accordance with the DES encryption algorithm upon the DES algorithm being keyed by the unique subscriber key seed signal on line 179. Eight bits of the unique subscriber key signal on line 181 are removed by a truncation function element 166 to reproduce the unique 56-bit subscriber key signal that was used in the scrambler to key the generation of the uniquely encrypted category key signal addressed to the descrambler.

Since the content of the subscriber key signal generated on line 181 by the subscriber key generator 165 depends upon the content of the subscriber key seed signal retrieved on line 179 from the secure memory 163 it is essential that the two address bits in the system key generation number address the location in the secure memory 163 containing the subscriber key seed signal that will key generation of a unique subscriber key signal identical to the one used in the scrambler to key the generation of the uniquely encrypted category key signal addressed to the descrambler.

The descrambler key distribution system further includes a category key generator 167. When the category key generator 167 receives a unique encrypted category signal addressed thereto on line 156 and the unique subscriber key signal is reproduced on line 182, the category key generator 167 generates a decrypted 64-bit category key signal on line 183 by processing the encrypted category key signal received on line 156 in accordance with the DES encryption algorithm upon the DES algorithm being keyed by the unique subscriber key signal on line 182. The remainder of the descrambler key distribution system 151 is described in Application Ser. No. 498,800.

With the exception of the keystream generator (not shown), the components of the scrambler key distribution system 151 (FIG. 1) are all contained on a single microprocessor chip, which is preferably a special version of the Intel 8751 Single-Component 8-Bit Microcomputer. The secure memory 163 is in the internal EPROM of this chip. An alternative to the Intel 8751 is a combination of Texas Instruments' TMS7041 and TMS70C40 microcomputers which provides a similar capability. The Intel "8751" chip is a stand-alone, high-performance single-chip computer fabricated with HMOS technology and packaged in a 40-pin DIP. It provides the hardware features, architectural enhancements and instruction set necessary to make it an effective controller in this cryptographic application. The EPROM in this special version of the 8751 chip contains 4K bytes of UV erasable read only memory which is only readable on-chip. The architecture does not provide any direct path from the EPROM to outside the chip once the external verify mode has been disabled in the manufacturing process by blowing the "verify mode" fuse. All the firmware that performs the generation and storage of the key signals is contained in this EPROM area. The extreme difficulty of reading the program stored in the secure EPROM of the 8751 chip also makes it much more difficult for a pirate to make use of lists of subscriber key signals and subscriber addresses, even if he should succeed in breaking the security system of the control computer to obtain the lists. If a pirate knows a valid subscriber key signal, he must also know the entire program content so that he can store the valid subscriber key signal seed and subscriber address in the memory. This would be exceedingly difficult to do without a complete program listing, which is protected by the manufacturers' security procedures.

Figure 3:
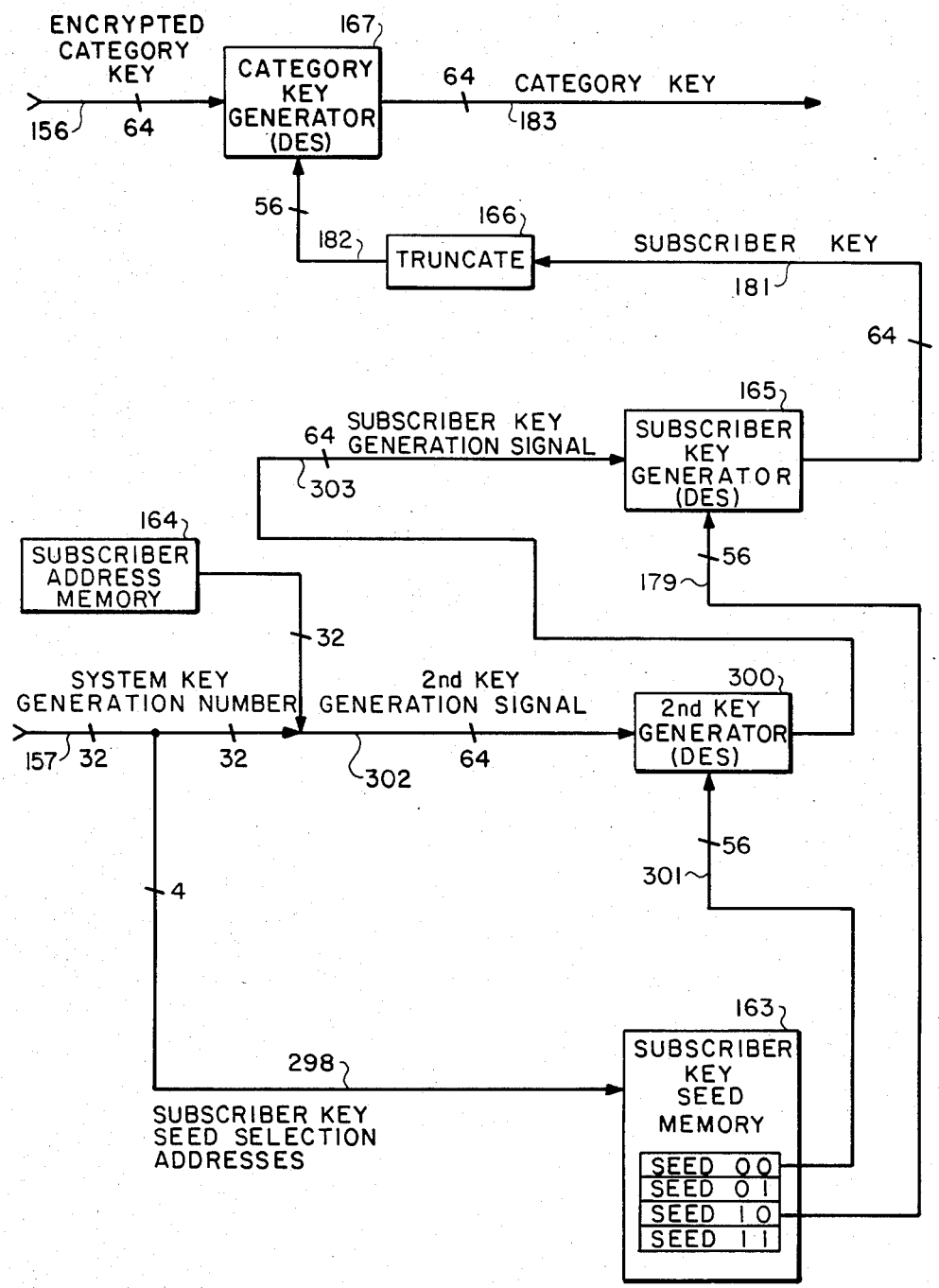
FIG. 3 is a functional block diagram of an alternative preferred embodiment of the subscriber key reproduction system of the present invention.
Figure 4:
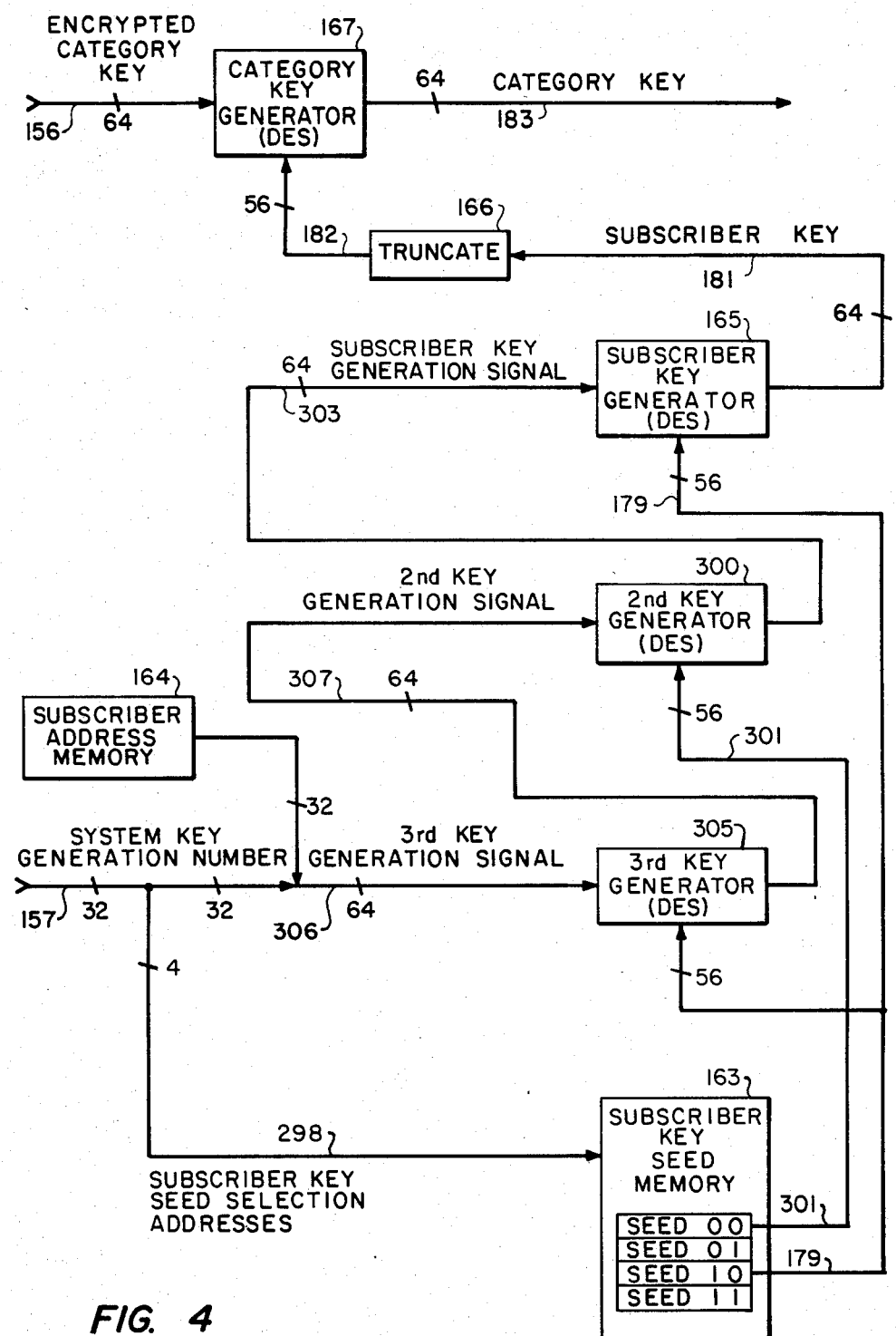
FIG. 4 is a functional block diagram of another alternative preferred embodiment of the subscriber key reproduction system of the present invention.

In the preferred embodiments shown in FIGS. 3 and 4 reproduction of the unique subscriber key signal is further complicated by utilizing two different key seed signals.

The embodiment of FIG. 3 includes the subscriber key seed memory 163, the subscriber address memory 164 and the subscriber key generator 165 which are included in the embodiment of FIG. 2, and further includes a second key generator 300.

The memory 163 is addressed via line 298 by two bits included in a first given position of the 32-bit system key generation number received on line 157 to provide a first prescribed one of the four stored unique subscriber 56-bit key seed signals on line 179, and is further addressed by two bits included in a second given position of the system key generation number received on line 157 to provide a second and different prescribed one of the four stored unique subscriber key seed signals on line 301.

The 32-bit unique subscriber address signal stored in the memory 164 is combined with the 32-bit subscriber key generation number received on line 157 to provide a 64-bit second key generation signal on line 302.

The second key generator 300 generates a unique 64-bit subscriber key generation signal on line 303 by processing the second key generation signal on line 302 in accordance with the DES encryption algorithm upon the DES algorithm being keyed by the second prescribed unique subscriber key seed signal on line 301.

The subscriber key generator 165 generates a unique 64-bit subscriber key signal on line 181 by processing the subscriber key generation signal on line 303 in accordance with the DES encryption algorithm upon the DES algorithm being keyed by the first prescribed unique subscriber key seed signal on line 179. Eight bits of the unique subscriber key signal on line 181 are removed by a truncation function element 166 to provide a unique 56-bit subscriber key signal on line 182 identical to the unique subscriber key signal that was used in the scrambler to key the generation of the uniquely encrypted category key signal addressed to the descrambler. In all other aspects the system of FIG. 3 is the same as the system of FIG. 2.

The embodiment of FIG. 4 includes the subscriber key seed memory 163, the subscriber address memory 164, the subscriber key generator 164 and the second key generator 300 which are included in the embodiment of FIG. 3, and further includes a third key generator 305.

The memory 163 is addressed via line 298 by two bits included in a first given position of the 32-bit system key generation number received on line 157 to provide a first prescribed one of the four stored unique subscriber 56-bit key seed signals on line 179, and is further addressed by two bits included in a second given position of the system key generation number received on line 157 to provide a second and different prescribed one of the four stored unique subscriber key seed signals on line 301.

The 32-bit unique subscriber address signal stored in the memory 164 is combined with the 32-bit subscriber key generation number received on line 157 to provide a 64-bit third key generation signal on line 306.

The third key generator 305 generates a unique 64-bit second key generation signal on line 307 by processing the third key generation signal on line 306 in accordance with the DES encryption algorithm upon the DES algorithm being keyed by the first prescribed unique subscriber key seed signal on line 179.

The second key generator 300 generates a unique 64-bit subscriber key generation signal on line 303 by processing the second key generation signal on line 307 in accordance with the DES encryption algorithm upon the DES algorithm being keyed by the second prescribed unique subscriber key seed signal on line 301.

The subscriber key generator 165 generates a unique 64-bit subscriber key signal on line 181 by processing the subscriber key generation signal on line 303 in accordance with the DES encryption algorithm upon the DES algorithm being keyed by the first prescribed unique subscriber key seed signal on line 179. Eight bits of the unique subscriber key signal on line 181 are removed by a truncation function element 166 to provide a unique 56-bit subscriber key signal on line 182 identical to the unique subscriber key signal that was used in the scrambler to key the generation of the uniquely encrypted category key signal addressed to the descrambler. In all other aspects the system of FIG. 4 is the same as the system of FIG. 2.

From the foregoing it is apparent that the subscriber key reproduction system of the present invention has several advantageous features.

One feature is that the unique subscriber key signal that is reproduced can be changed simply by changing the system key generation number that is provided by the control computer of the scrambler and inserted in the scrambled signal for broadcast therewith to the descrambler.

Another feature is that different sets of unique subscriber key signals for a given subscriber communication network can be generated for use by different broadcasters, whereby scrambled signals from different broadcasters can be uniquely descrambled by the same descrambler. Accordingly, each broadcaster using the system can be provided with its own independent listing of unique subscriber key signals without comprising the confidentiality of the listings of the other broadcaster.

An additional feature is that storage of a plurality of different key seed signals in the memory of the descrambler provides a backup in the event that one listing of key seed signals accessed by a common address in the system key generation number should become comprised. To exploit this advantage the listings corresponding to the different addresses must be secretely stored in separate locations.

A further feature is that only one of listings of commonly addressed key seed signals need be removed from such secret storage at a time in order to generate a new listing of unique subscriber key signals for the subscriber network, thereby reducing the possibility of compromising the security of the entire network during such generation process.

Although the preferred embodiments of the system of the present invention are described herein for use in a subscriber television network, the system of the present invention is applicable to and useful in other types of subscriber communications networks, such as for example, a subscriber telephone network. In a subscriber telephone network, each subscriber is in essence a broadcaster and has both a scrambler and a descrambler. Accordingly, each subscriber would be provided with its own unique listing of unique subscriber key numbers for enabling it to broadcast to the descramblers of the other subscribers of the network, and would also be provided with a correlated system key generation number that would be broadcast in common to all of the other subscribers in the network. Should one subscriber's listing of unique subscriber key signals become comprised, the listings of the other subscribers would not likewise be compromised and the one subscriber simply could be provided with a new listing and a new correlated system key generation number.

The system of the present invention likewise is useful with a subscriber computer interface network in the same manner as with the subscriber telephone network described above.

What is claimed is:

1. A system for reproducing in a descrambler a subscriber key signal that is unique to the descrambler and was used in encrypting a key signal that must be decrypted for use in descrambling a signal received by the descrambler, wherein the scrambled signal is received by the descrambler together with the encrypted key signal and an address for accessing a predetermined area in a memory contained in the descrambler, the system comprising means for providing a subscriber key generation signal;

a subscriber key generator for reproducing said unique subscriber key signal by processing the subscriber key generation signal in accordance with a predetermined encryption algorithm upon said algorithm being keyed by a prescribed subscriber key seed signal that is unique to the descrambler;

a first memory storing the prescribed subscriber key seed signal, and for providing the prescribed seed signal to key the algorithm when the area of the memory containing the prescribed seed signal is accessed by the address received with the received key generation number; and means for accessing the first memory with the received address.

2. A system according to claim 1, wherein the first memory stores a plurality of different subscriber key seed signals, with the prescribed one of said seed signals being provided to key the algorithm in accordance with the received address.

3. A system according to claim 2, wherein the first memory is a secure memory.

4. A system according to claim 1, wherein the first memory is a secure memory.

5. A system according to claim 1, wherein a key generation number also is received by the descrambler and wherein the means for providing the subscriber key generation signal comprises a second memory storing a subscriber address signal that is unique to the descrambler; and means for combining the stored subscriber address signal and the received key generation number to provide the subscriber key generation signal.

6. A system according to claim 5, wherein the first memory stores a plurality of different subscriber key seed signals, with the prescribed one of said seed signals being provided to key the algorithm in accordance with the address received with the received key generation number.

7. A system according to claim 6, wherein the first memory is a secure memory.

8. A system according to claim 1, wherein the means for providing the subscriber key generation signal comprises a second key generator for producing the subscriber key generation signal by processing a signal derived from a signal containing a subscriber address that is unique to the descrambler in accordance with a second predetermined encryption algorithm upon said second algorithm being keyed by a second prescribed key seed signal that is unique to the descrambler; and wherein the first memory also stores the second prescribed seed signal and provides the second prescribed seed signal to key the second algorithm when the area of the first memory containing the second prescribed seed signal also is accessed by the received address.

9. A system according to claim 8, wherein a key generation number also is received by the descrambler and wherein the means for providing the subscriber key generation signal further comprises a second memory storing a subscriber address signal that is unique to the descrambler; and means for combining the stored subscriber address signal and the received key generation number to provide said subscriber address containing signal.

10. A system according to claim 9, wherein the means for providing the subscriber key generation signal further comprises a third key generator for producing said signal derived from said subscriber address containing signal by processing said subscriber address containing signal in accordance with a third predetermined encryption algorithm upon said third algorithm being keyed by a prescribed key seed signal that is stored in the first memory and is unique to the descrambler; and wherein the first memory provides the prescribed key seed signal for keying the third algorithm when the area of the first memory containing said seed signal for keying the third algorithm is accessed by the address received with the received key generation number.

11. A system according to claim 10, wherein the same prescribed key seed signal is provided by the first memory for keying two of the algorithms.

12. A system according to claim 10, wherein the first memory is a secure memory.

13. A system according to claim 8, wherein the means for providing the subscriber key generation signal further comprises a third key generator for producing said signal derived from said subscriber address containing signal by processing said subscriber address containing signal in accordance with a third predetermined encryption algorithm upon said third algorithm being keyed by a prescribed key seed signal that is stored in the first memory and is unique to the descrambler; and wherein the first memory provides the prescribed key seed signal for keying the third algorithm when the area of the first memory containing said seed signal for keying the third algorithm is accessed by the address received with the received key generation number.

14. A system according to claim 13, wherein the same prescribed key seed signal is provided by the first memory for keying two of the algorithms.

15. A system according to claim 13, wherein the first memory is a secure memory.

16. A system according to claim 1, wherein the means for providing the subscriber key generation signal comprises a second key generator for producing the subscriber key generation signal by processing a signal containing a subscriber address that is unique to the descrambler in accordance with a second predetermined encryption algorithm upon said second algorithm being keyed by a second prescribed key seed signal that is unique to the descrambler, and wherein the first memory also stores the second prescribed key seed signal and provides the second prescribed seed signal to key the second algorithm when the area of the first memory containing the second prescribed seed signal also is accessed by the received address.

17. A system according to claim 16, wherein a key generation number also is received by the descrambler and wherein the means for providing the subscriber key generation signal further comprises a second memory storing a subscriber address signal that is unique to the descrambler; and means for combining the stored subscriber address signal and the received key generation number to provide said subscriber address containing signal.

18. A system according to claim 16, wherein the first memory is a secure memory.

19. In a subscriber communication network, wherein a common key signal is uniquely encrypted for each of a plurality of subscribers and must be decrypted by the use of a subscriber key signal that is unique for each subscriber for use in descrambling a scrambled signal, and wherein each subscriber has a descrambler for descrambling the scrabled signal, a system for reproducing in each descrambler, the subscriber key signal that is unique to such descrambler, wherein the scrambled signal is received by the descrambler together with the uniquely encrypted common key signal, a key generation number that is common to a group of the descramblers in the network and an address for accessing a predetermined area in a memory contained in each descrambler, the system comprising:

means for providing a subscriber key generation signal;

a subscriber key generator for reproducing said unique subscriber key signal by processing the subscriber key generation signal in accordance with a predetermined encryption algorithm upon said algorithm being keyed by a prescribed subscriber key seed signal that is unique to the descrambler;

a first memory storing the prescribed subscriber key seed signal, and for providing the prescribed seed signal to key the algorithm when the area of the memory containing the prescribed seed signal is accessed by the address received with the received key generation number; and means for accessing the first memory with the address received with the received key generation number.

20. A system according to claim 19, wherein the first memory stores a plurality of different subscriber key seed signals, with the prescribed one of said seed signals being provided to key the algorithm in accordance with the address received with the received key generation number.

21. A system according to claim 19, wherein the means for providing the subscriber key generation signal comprises a second memory storing a subscriber address signal that is unique to the descrambler; and means for combining the stored subscriber address signal and the received key generation number to provide the subscriber key generation signal.

22. In a subscriber communication network wherein a common key signal is uniquely encrypted for a subscriber by a plurality of different scrambled signal broadcasters and must be decrypted by using a subscriber key signal that is unique to both the subscriber and the broadcaster for use in descrambling a scrambled signal, and wherein the subscriber has a descrambler for descrambling the scrambled signal from a given one of the broadcastes by using the subscriber key signal that is unique to the given broadcaster to decrypt the uniquely encrypted key signal, a system for reproducing in the descrambler the subscriber key signal that is unique to the given broadcaster, wherein the scrambled signal from the given broadcaster is received by the descrambler together with the uniquely encrypted key signal, a key generation number that is unique to the given broadcaster and, an address for accessing a predetermined area in a memory contained in the descrambler, the system comprising means for providing a subscriber key generation signal;

a subscriber key generator for reproducing said unique subscriber key signal by processing the subscriber key generation signal in accordance with a predeterined encryption algorithm upon said algorithm being keyed by a prescribed subscriber key seed signal that is unique to the descrambler;

a first memory storing the prescribed subscriber key seed signal, and for providing the prescribed seed signal to key the algorithm when the area of the memory containing the prescribed seed signal is accessed by the address received with the received key generation number; and means for accessing the first memory with the address received with the received key generation number.

23. A system according to claim 22, wherein the first memory stores a plurality of different subscriber key seed signals, with the prescribed one of said seed signals being provided to key the algorithm in accordance with the address received with the received key generation number.

24. A system according to claim 23, wherein the means for providing the subscriber key generation signal comprises:

a second memory storing a subscriber address signal that is unique to the descrambler; and means for combining the stored subscriber address signal and the received key generation number to provide the subscriber key generation signal.

* * * * *